Oct. 2, 1956
C. L. KEPNER
2,764,824
REVERSIBLE IMPLEMENT ARM MOUNTING FOR TRACTORS
Filed May 5, 1953
2 Sheets-Sheet 1
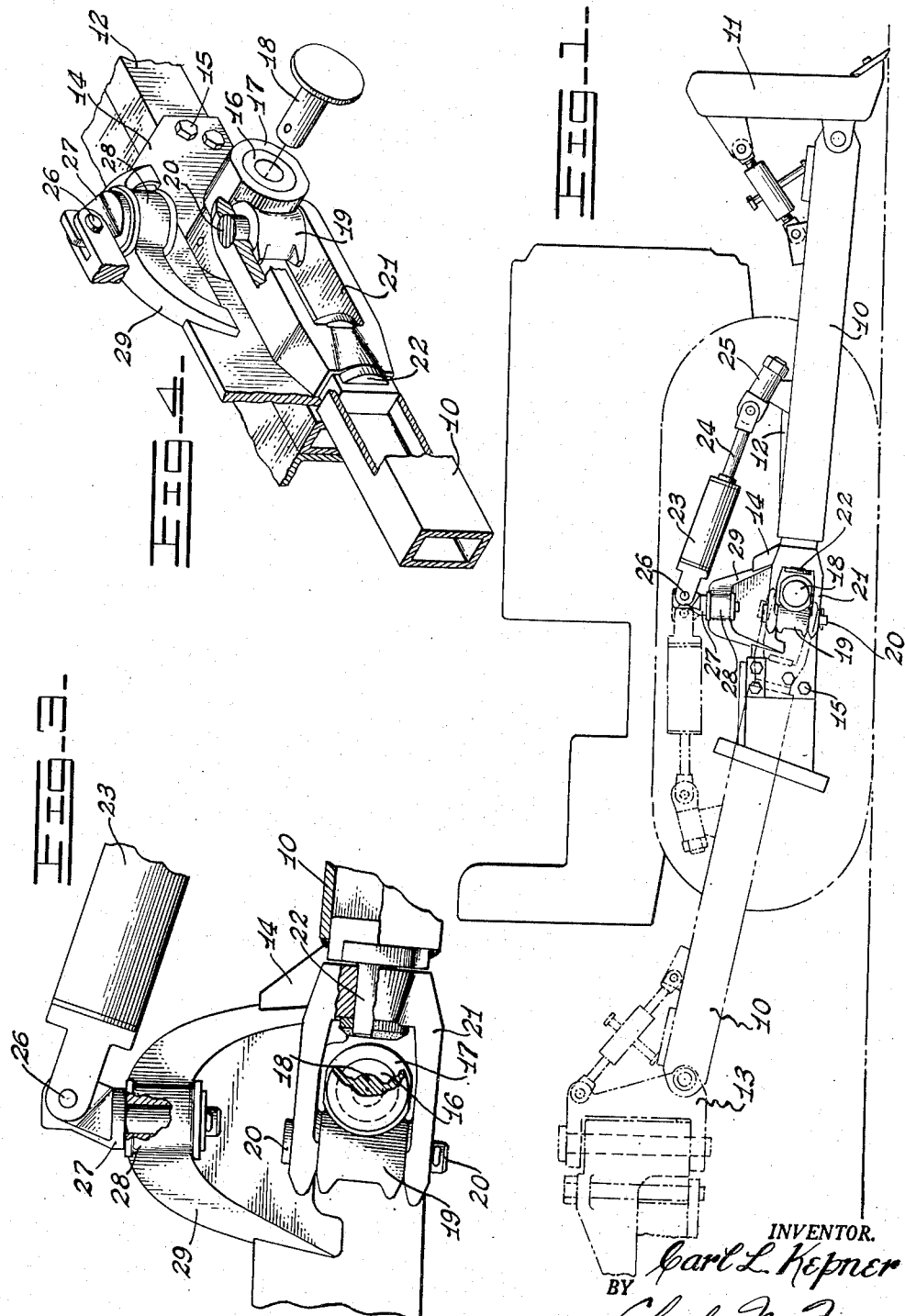
INVENTOR.
Carl L. Kepner
BY
Charles M. Fryer
Attorney Oct. 2, 1956  C. L. KEPNER  2,764,824
REVERSIBLE IMPLEMENT ARM MOUNTING FOR TRACTORS
Filed May 5, 1953  2 Sheets-Sheet 2
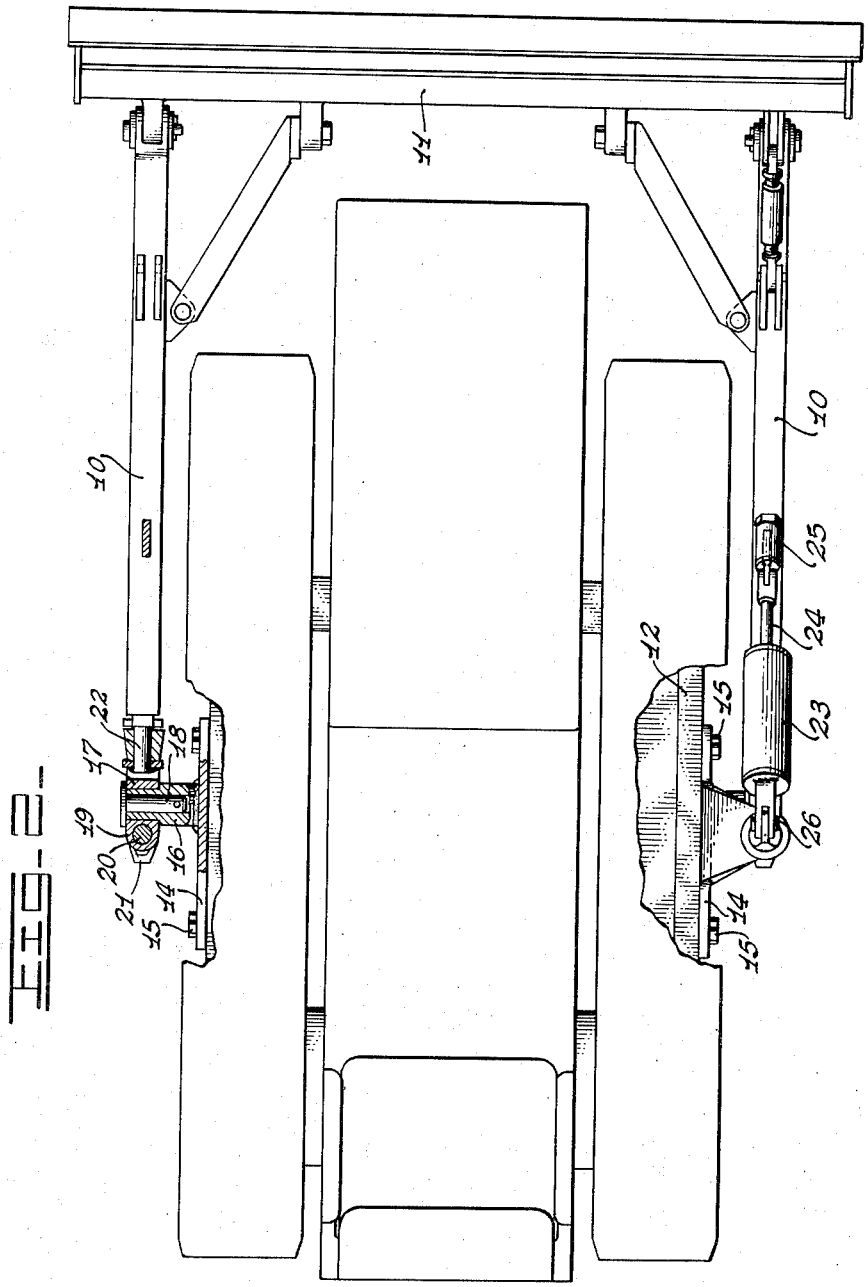
INVENTOR.
Carl L. Kepner
BY
Charles M. Fryer
Attorney

United States Patent Office 2,764,824
Patented Oct. 2, 1956

2,764,824

REVERSIBLE IMPLEMENT ARM MOUNTING FOR TRACTORS

Carl L. Kepner, Morton, Ill., assignor to Caterpillar Tractor Co., Peoria, Ill., a corporation of California Application May 5, 1953, Serial No. 353,096

4 Claims. (Cl. 37—144)

This invention relates to reversible implement arm mountings for tractors of various types.

It is conventional practice to provide implement arms on a tractor which are pivotally or universally mounted at opposite sides of the tractor to extend forwardly as pusher arms for a bulldozer or loader or the like or to extend rearwardly as draft arms for a tool bar or other similar implement. Forwardly and rearwardly extending arms are usually both designed to be raised by lift means powered by a hydraulic jack or the like, and it is necessary on reversible arms to provide a jack mechanism that will operate in either position of the arms.

It is to such reversible arms that the present invention is directed and particularly to fittings adapted to be secured to opposite sides of a tractor and to support such arms and their operating mechanism in a manner to make them quickly and easily reversible without disconnecting them from the tractor.

It is an object of the present invention to provide connections between a pair of implement arms and a tractor which enables the arms to be swung from a forward to a rearwardly directed position without the necessity of detaching the arms or their power actuated raising mechanism from the tractor.

Further and more specific objects and advantages of the invention are made apparent in the following specification wherein a preferred form of the invention is described in detail by reference to the accompanying drawings.

In the drawings:

Fig. 1 is a view in side elevation of a set of reversible implement arms embodying the present invention illustrated as secured to the side of a track-type tractor and extending forwardly therefrom and also illustrated in broken lines in their rearwardly extending position, Fig. 2 is a view of the same assembly illustrated in Fig. 1 but shown in plan and with parts shown in section, Fig. 3 is an enlarged fragmentary detail of a portion of the connecting means between the arms and the tractor with parts broken away and parts shown in section, and Fig. 4 is an enlarged fragmentary perspective view of the same connecting means with parts broken away.

Referring first to Figs. 1 and 2 of the drawings, a pair of forwardly extending implement arms is illustrated at 10 at carrying a conventional bulldozer blade 11 and as connected to the truck frames 12 of a track-type tractor by connecting means presently to be described in detail and which enables the arms to be readily swung from their forwardly directed position to the rearwardly directed position illustrated in Fig. 1 wherein they are shown as supporting a tool bar, a portion of which is illustrated at 13.

A track-type tractor is used herein for purposes of illustration but it will be understood as the description proceeds that the invention is readily adaptable to any type of draft implement. It is common practice to connect implement arms of the kind herein disclosed to the sides of the tractor usually by a ball and socket connection which enables the arms to be raised and lowered and twisted in a manner necessary to accommodate the movement of the implement that is being pushed or pulled. However in order to reverse the position of such arms, it is necessary that they be disconnected from the tractor and also necessary that the means employed for raising and lowering the arms be likewise disconnected so that the reversal of the position of the arms requires considerable time and labor.

According to the present invention, the mountings for the implement arms are carried on bracket plates 14 secured as by bolts 15 or the like to the truck frames 12 or other suitable rigid portions of the draft implement. Each of these bracket plates carries an outwardly extending trunnion 16 best illustrated in Fig. 2 about which is fitted a bearing 17 held in place by the head of a pin 18 which slides into a bore in the trunnion and may be secured therein. Secured to or formed integrally with one side of the bearing 17 is a vertical bearing 19. A pin 20 extends through the bearing 19 and passes through the ends of a yoke 21 to form a pivotal support therefor. The opposite end of the yoke carries a swivel pin 22 to which one of the draft arms 10 is connected.

The trunnion 17 and bearing 16 permits raising and lowering of the implement arms and the swivel pin 22 permits twisting of the arms to follow the sidewise rocking or twisting of the implement that is being pushed or drawn. The bearing 19 and the pin 20 serve when the implement is detached from the outer ends of the arms to permit the arms to be swung in a horizontal plane from the forwardly directed position illustrated in full lines in Fig. 1 to the rearwardly directed position illustrated in broken lines in the same figure and thus enables reversal of the position of the implement arms without detaching them from the tractor.

A power actuated raising and lowering means is illustrated as a hydraulic jack 23 shown in Figs. 1 and 2 with an extensible and retractable connecting rod 24 connected with an anchor fitting 25 on the implement arm. A similar jack is provided for each arm. The opposite end of the cylinder 23 is connected as by a pin 26 to a swivel pin 27 rotatably carried in a bearing 28 supported by a bearing bracket 29 rigidly fixed to the bracket plate 14 in approximate vertical alignment with the bearing pin 20.

The jacks are actuated to raise and lower the implement arms 10 by means of fluid under pressure selectively directed to opposite ends of the cylinders through flexible hoses not shown. This structure is conventional and its illustration herein is therefore not necessary but it will be understood that the flexibility of the hydraulic connections enables the jack mechanism to be swung about its pivotal support 27 so that it will assume an operating position with relation to the implement arms 10 when forwardly directed as well as when rearwardly directed. Furthermore it is unnecessary to disconnect the jacks or any of their associated parts while the implement arms are being swung from one position to the other.

Through the structure herein disclosed, the reversal of the position of the implement arms is made possible with a minimum of time and effort.

I claim:

1. In combination with a tractor having implement arms secured to its opposite sides, a connection for each arm including a vertical pivot to enable the arms to be swung in a horizontal plane between forward and rearwardly directed positions with relation to the tractor, power actuated raising and lowering means connected between the tractor and each arm, the connection of said means with the tractor including vertical pivots whereby the raising and lowering means will swing with said arms when their position is reversed.

2. Means for mounting a reversible implement arm on a tractor which comprises an articulated connection between one end of the arm and the tractor, and a substantially vertical pivot in said connection to permit the arm to swing horizontally between forwardly and rearwardly directed positions with relation to the tractor, a jack for raising and lowering the arm about its articulated connection, and a pivotal connection between the jack and the tractor to permit the jack to swing with the arm about its vertical pivotal connection.

3. A mounting for a reversible implement arm on a tractor which comprises a trunnion extending horizontally outwardly from the tractor, a bearing on said trunnion, a substantially vertically disposed bearing secured to one side of the first bearing, a yoke with a bifurcated end embracing the vertical bearing, a pivot pin connecting the yoke and vertical bearing for horizontal swinging movement with respect to the tractor, and an implement arm extending from the opposite end of the yoke said yoke being of sufficient size to permit 180° reversal of the arm position without interfering with said trunnion and trunnion bearing.

4. A mounting for a reversible implement arm on a tractor which comprises a trunnion extending horizontally outwardly from the tractor, a bearing on said trunnion, a substantially vertically disposed bearing secured to one side of the first bearing, a yoke with a bifurcated end embracing the vertical bearing, a pivot pin connecting the yoke and vertical bearing for horizontal swinging movement with respect to the tractor, an implement arm extending from the opposite end of the yoke, and a swivel connection between the yoke and the implement arm said yoke being of sufficient size to permit 180° reversal of the arm position without interfering with said trunnion and trunnion bearing.

References Cited in the file of this patent
UNITED STATES PATENTS

| | | |
|---|---|---|
| Re. 23,726 | Lindeman | Oct. 20, 1953 |
| 1,765,854 | Tellis | June 24, 1930 |
| 2,604,176 | Lindeman | July 22, 1952 |
| 2,634,518 | Merz | Apr. 14, 1953 |
| 2,640,286 | Briscoe | June 2, 1953 |